(12) United States Patent
Janovicz et al.

(10) Patent No.: US 10,377,047 B2
(45) Date of Patent: Aug. 13, 2019

(54) MAGNETICALLY ACTUATED LATCH

(71) Applicant: Benchmade Knife Co., Inc., Oregon City, OR (US)

(72) Inventors: Daniel Janovicz, Oregon City, OR (US); Wes Duey, Oregon City, OR (US)

(73) Assignee: Benchmade Knife Co., Inc., Oregon City, OR (US)

( * ) Notice: Subject to any disclaimer, the term of this patent is extended or adjusted under 35 U.S.C. 154(b) by 0 days.

(21) Appl. No.: 15/844,435

(22) Filed: Dec. 15, 2017

(65) Prior Publication Data

US 2018/0178398 A1    Jun. 28, 2018

Related U.S. Application Data

(60) Provisional application No. 62/438,661, filed on Dec. 23, 2016.

(51) Int. Cl.
| | |
|---|---|
| *B26B 1/04* | (2006.01) |
| *B26B 1/00* | (2006.01) |
| *B26B 1/10* | (2006.01) |
| *F16B 1/00* | (2006.01) |

(52) U.S. Cl.
CPC ............... *B26B 1/04* (2013.01); *B26B 1/10* (2013.01); *F16B 1/00* (2013.01); *F16B 2001/0035* (2013.01)

(58) Field of Classification Search
CPC ..... B26B 1/04; B26B 1/10; F16B 1/00; F16B 2001/0035
USPC .......................................... 30/151, 153, 155
See application file for complete search history.

(56) References Cited

U.S. PATENT DOCUMENTS

| | | | | |
|---|---|---|---|---|
| 4,364,174 | A | * 12/1982 | De Asis | B26B 1/10 |
| | | | | 30/153 |
| 4,672,743 | A | * 6/1987 | Grahm | B26B 1/00 |
| | | | | 30/153 |
| 6,195,898 | B1 | 3/2001 | Lemisch | |
| D701,103 | S | * 3/2014 | Marfione | D8/99 |
| 2004/0181946 | A1 | 9/2004 | Lemisch | |
| 2006/0200996 | A1* | 9/2006 | Pearman | B26B 1/04 |
| | | | | 30/158 |

* cited by examiner

*Primary Examiner* — Omar Flores Sanchez
(74) *Attorney, Agent, or Firm* — Schwabe Williamson & Wyatt, P.C.

(57) ABSTRACT

A magnetic latch having a latch arm with a proximal end and a distal end, the proximal pivotally mounted to a butt end of a first handle half, wherein the proximal end of the latch end includes a first magnetic element that is magnetically coupled to the first handle half to preferentially extend the latch arm axially with respect to a long axis of the first handle half, and the distal end including a coupling element. The magnetic latch further having a retention element at the butt and of a second handle half that couples to the coupling element to securely latch the first handle half and the second handle half together. A butterfly knife having a magnetic latch to securely latch the first handle half and the second handle half together, either in in the closed or open position.

18 Claims, 5 Drawing Sheets

MAGNETICALLY ACTUATED LATCH

CROSS-REFERENCE TO RELATED APPLICATION

This application claims the priority benefit of the earlier filing date of U.S. Provisional Patent Application No. 62/438,661, filed Dec. 23, 2016, which is hereby incorporated herein by reference in its entirety.

TECHNICAL FIELD

The present disclosure relates to latch mechanisms, and more particularly to latches used in tools such as knives, and even more particularly to a magnetically actuated mechanical latch that is used in a butterfly-type knife, such as a BALI-SONG® knife.

BACKGROUND

A butterfly style knife is a conventional and very traditional knife that has ancient origins and which is greatly appreciated by knife enthusiasts. Described generally, a butterfly style knife, such as sold under the tradename BALI-SONG® by the BENCHMADE knife company, has a single blade that is pivotally attached to two separate handle pieces at two separate pivot points located on opposite sides of a tang portion of the knife blade. These knives have a fully closed position in which the two handle halves are rotated over the blade so that the blade is fully stowed between (and at least partially within) the opposed handles. In this position the sharp edge of the blade, or sharp edges if both sides of the blade are sharpened, is safely retained in one or both of the handles. These knives also have a fully open position. In the fully open position the two handle halves have been rotated 180 degrees from the fully closed position so that the blade extends away from the now-paired handle halves into a position ready for use. In this position the two handle halves are oriented parallel to one another and the user grasps both handle halves at once to define a unitary handle. The two pivot points or pivot axes between the blade and the two handle halves hold the blade in a rigid working position relative to the handle.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
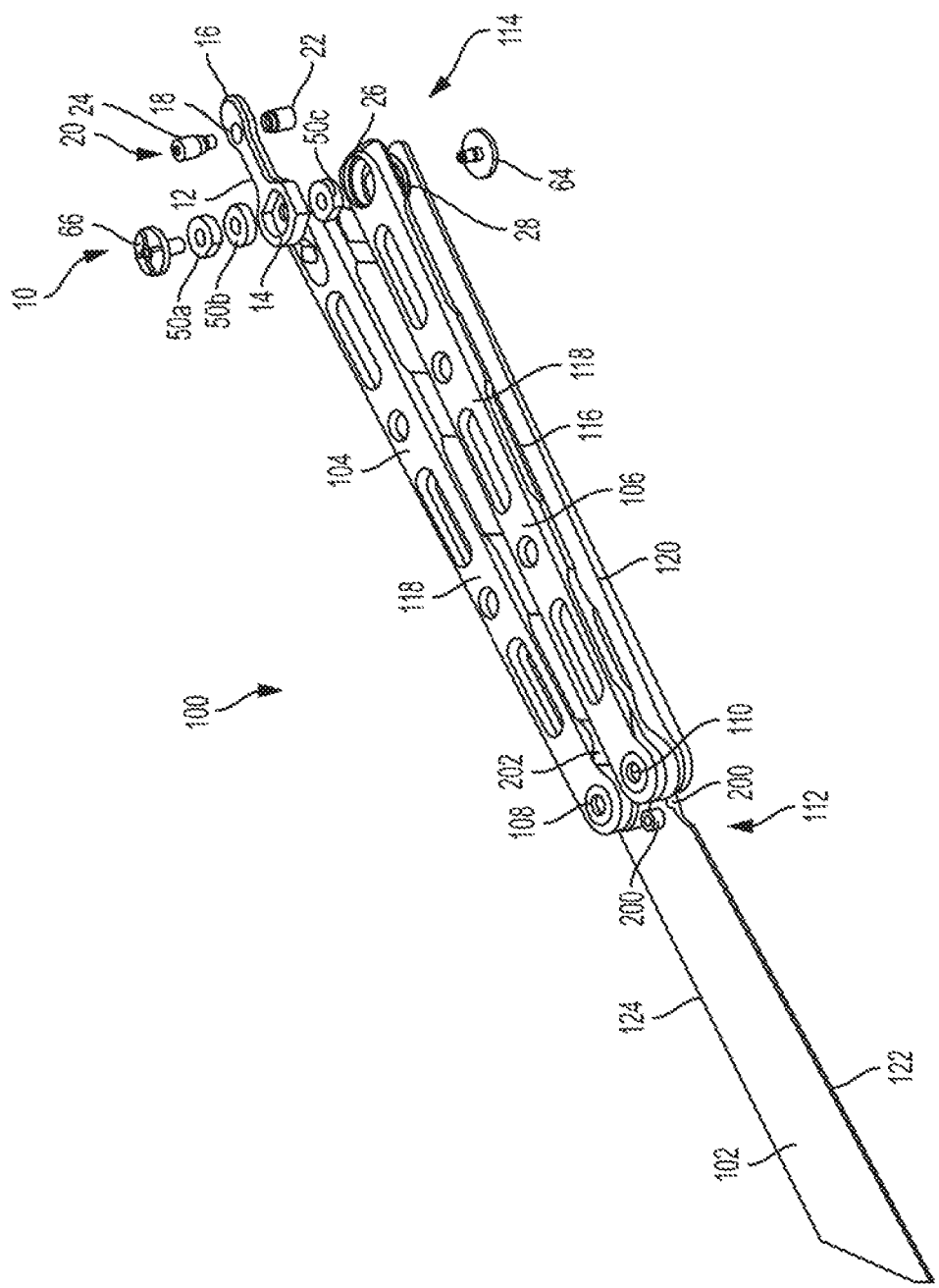
FIG. 1 is a perspective and partially exploded view of a knife which includes a magnetically actuated mechanical elongate latch arm as disclosed herein and which the components thereof are illustrated exploded away from the butt ends of the two handle halves, in accordance with various embodiments.

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Most butterfly style knifes, such as BALI-SONG® knives, include a latch that holds to two handle halves together when the knife is in either the fully closed position or the fully open position. There are several types of conventional latches for these knives, but the most common latch is defined by an elongate latch arm that is pivotally attached to the rearward, exposed end of one of the two handle halves. When the two handle halves are oriented parallel to one another, for example when the knife is fully closed or when the knife is fully open, the elongate latch arm may be pivoted about its attachment to one handle half toward the other handle half where the distal end of the latch arm engages a cooperatively shaped seat on the other handle half. Once engaged, the latch arm secures the two handle halves with the knife in either the open or closed position as the case may be.

The foregoing basic description of a butterfly style knife, such as a BALI-SONG® knife, is useful to describe some of the features of these knives that aficionados of the knives enjoy. Specifically, butterfly style knives, such as a BALI-SONG® knifes are used to perform a variety of elaborate "moves" in which the user flips the blade from closed to open positions, from open to closed, and numerous positions in between. These elaborate techniques are well-known to knife users and have a long history borne out of use of butterfly style knives, such as a BALI-SONG® knifes, for defensive, combat and ceremonial purposes. There are many videos showing BALI-SONG® techniques on online video channels such as YouTube and they are instructive on how these knives are used.

While the elongate latch arm described above is a useful safety device, it will be appreciated that during the elaborate flipping techniques for users of the butterfly style knifes, such as a BALI-SONG® knifes, two handle halves cannot be latched together, else the handles could not be manipulated relative to the blade as is required to perform the techniques. As such, the elongate latch arm can be seen by some users as an impediment to proper use of the knife for performing elaborate flipping techniques. Indeed, because some of the techniques are performed so rapidly and with such precision that there is only minimal clearance between the user's hand and arm during the technique, the elongate latch arm can get in the way and can even hit the user's hand and/or arm. This interferes with proper flipping technique and some users remove or cut the elongate latch arm off their butterfly style knifes, such as a BALI-SONG® knifes. While this defeats an obvious safety mechanism, it allows the sophisticated user to perform their moves without interference from the latch arm. But even more bothersome to many users is the fact that during the flipping techniques the latch arm itself flips back and forth as the handles are rapidly manipulated and flipped, causing an irritating and distracting clicking sound. In some cases the latch flopping around can cause damage to the latch, handle or the blade.

In view of the forgoing and other reasons, there is a need for innovative apparatuses and methods that allow users of butterfly style knifes, such as a BALI-SONG® knife, to enjoy the safety afforded by the handle latch mechanisms, but without the negative aspects described above and especially without the annoying clicking caused by the latch arm flipping back and forth during use of the knife. The present disclosure defines such apparatus and method. Those of skill in the art will readily recognize that while the disclosure is drafted with respect to a specific type of knife, the disclosure is not limited to knives but extends to any tool that requires movement of one structure relative to another.

Disclosed herein is a magnetic latch for a folding knife, such as a butterfly knife, for example, as sold under the trade name BALI-SONG® by the BENCHMADE® knife company. In embodiments, the magnetic latch includes a latch arm having a proximal end and a distal end. In embodiments, the proximal end of the latch arm is pivotally mounted to a butt end (i.e. proximal to the butt end) of a first handle half of the knife. The latch arm includes, at the proximal end, a first magnetic element that is magnetically coupled to the first handle half to preferentially extend the latch arm axially with respect to a long axis of the first handle half, for example by interaction with a magnet or some ferromagnetic material in the handle that orients the latch arm in the extended configuration. This preferential extension is in the absence of an applied force such that when the user applies a force to the latch, the latch can be rotated to contact a feature in the second handle half (as described below) to secure the handle halves in either an open or closed position. This latching is made possible by the inclusion of a coupling element at the distal end of the latch arm. In embodiments, the magnetic latch further includes a retention element at the butt end of a second handle half, that couples to the coupling element on the distal end of the latch arm to securely latch the first handle half and the second handle half together.

Also disclosed is butterfly knife, such as a BALL-SONG® knife, having a magnetic latch as described herein. In embodiments, the butterfly knife includes a first handle half having a first side wall, a second sidewall, a front end, and a butt end, and a second handle half having a first side wall, a second sidewall, a front end, a butt end, and a retention element at the butt end. The butterfly knife further includes a blade having a working end and a tang, wherein the front end of the first handle half and the front end of the second handle half are independently pivotally attached to the tang at independent pivot points; and wherein the first handle half and the second handle half can be independently moved to an open position and a closed position. The butterfly knife further includes a disclosed magnetic latch, such as described herein.

In certain embodiments, the first handle half comprises a first side wall and a second sidewall and wherein the latch arm is pivotally mounted between the first side wall and the second sidewall.

In certain embodiments, the coupling element at the distal end of the latch arm includes an engagement boss. In certain embodiments, the engagement boss includes engagement knobs extending away from the latch arm on either side thereof. In certain embodiments, the retention element includes a lands on the butt end of the second handle half and the engagement boss is configured to engage the lands. In certain embodiments, the first handle half includes at least one additional magnetic element that magnetically couples to the first magnetic element to cause the latch arm to extend. In certain embodiments, the first handle half includes a ferromagnetic insert that magnetically couples to the first magnetic element to cause the latch arm to extend. In certain embodiments, the first sidewall of the first handle half includes at least one second magnetic element that magnetically couples to the first magnetic element to cause the latch arm to extend. In certain embodiments, the first sidewall of the first handle half includes at least one additional magnetic element and the second sidewall of the first handle half includes at least one third magnetic element that magnetically couples to the magnetic element to cause the latch arm to extend.

Turning now to the figures, embodiments of the disclosed magnetic latch and/or a butterfly-type knife including such a latch will be discussed. A knife 100 that incorporates a magnetically actuated mechanical latch mechanism 10 according to the disclosure is shown in FIG. 1. The basic components of the knife 100 will be described first, prior to a detailed description of the disclosed latch mechanism 10. The knife 100 includes a blade 102 that is pivotally and separately attached to two independent handle halves 104 and 106 at pivot points 108 and 110. The pivot points 108 and 110 are at the "forward" end 112 of the handle halves 104 and 106 and the pivots are defined by pivot shafts such as those shown, which define blade pivot axes. The blade 102 includes laterally opposed pivot axis bores through which the respective pivot shafts extend—the pivot axis bores are not visible in the view of FIG. 1. The opposite or rearward (or butt) end of the handle halves is identified with reference number 114; the latch mechanism 10 is attached as described below to the rearward end 114 of the handle half 106. Each of the two handle halves 104 and 106 includes a blade slot 116 between opposed sidewalls 118 and 120 along one side of each of the handle halves 104 and 106. The blade slot 116 of the handle half 104 is not readily visible in the perspective view of FIG. 1.

In FIG. 1, the blade 102 is in the open position—that is, the blade 102 is extending away from the paired handle halves 104 and 106, which are parallel to one another in terms of the longitudinal axes as defined by the handle halves 104 and 106. It will be understood that each of the handle halves 104 and 106 is independently pivotal about the individual pivot axis at which the handle halves 104 and 106 are attached to the blade 102. As such, when the two handle halves 104 and 106 are rotated about their respective blade pivot axes by 180 degrees (i.e., in the view of FIG. 1 handle half 104 would be rotated counterclockwise and the handle half 106 would be rotated clockwise), the opposed edges of the blade 102 (in FIG. 1, a sharpened edge 122 and opposite a non-sharpened edge 124) are received in the blade slot 116 of the respective handle half that is oriented over the blade. If the knife 100 of FIG. 1 were thus in the closed position with the handle halves rotated 180 degrees relative to what is shown in the drawing, sharpened edge 122 would be received in blade slot 116 of handle half 106 and non-sharpened edge 124 would be received in the blade slot 116 of handle half 104. And when the handle halves 104 and 106 are rotated in this way, they are again oriented parallel to one another. It will be understood that the various open voids formed in the handle halves 104 and 106 shown in the drawings, while functional for weight savings, ornamental appearance and for cleaning, are optional and are not limiting on the disclosure.

It is useful for purposes herein to describe the handle half 106 to which the latch mechanism 10 is attached as the "latch handle." In the same way, the handle half 104 includes the structures that the latch mechanism engages when the latch mechanism 10 is in a latched position (as detailed below). As such, the handle half 104 is sometimes referred to herein as the "catch handle."

Figure 2:
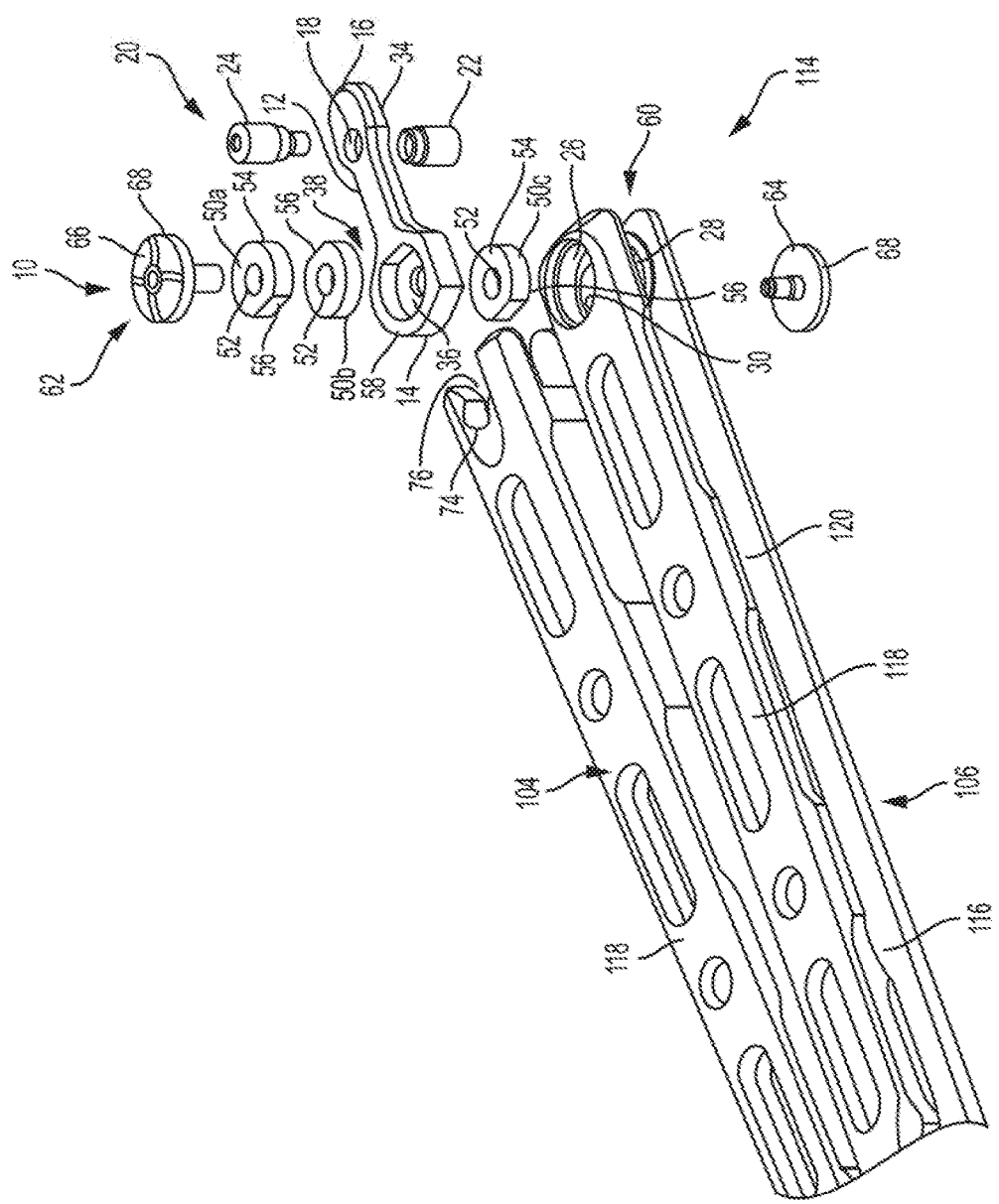
FIG. 2 is a close up perspective and exploded view of the knife of FIG. 1, illustrating the components of the disclosure magnetically actuated latch juxtaposed next to the handle halves, in accordance with various embodiments.
Figure 3:
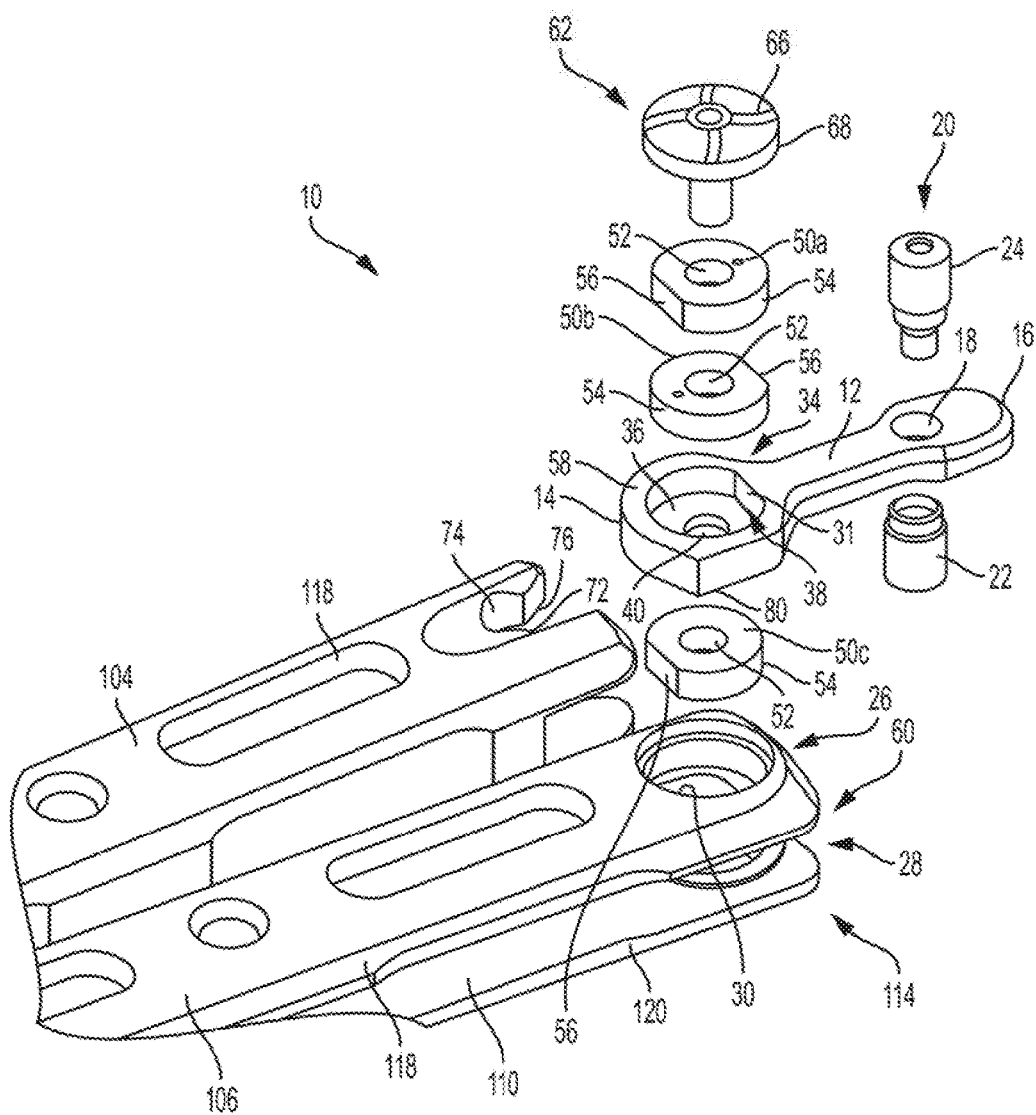
FIG. 3 is a perspective and exploded view similar to FIG. 2, in accordance with various embodiments.

The magnetically actuated mechanical latch mechanism 10 according to the disclosure will now be described with reference to the embodiment that is shown in FIGS. 1, 2 and 3. An elongate latch arm 12 is pivotally mounted at the proximate end 14 thereof to the butt end 114 of handle half 106, between side walls 118 and 120. The distal end 16 of the latch arm 12 includes a bore 18 formed therethrough. A two piece engagement boss 20 is attached to the distal end with the two pieces of the engagement boss 20 threaded together such that the engagement boss 20 has engagement knobs 22 and 24 extending away from the latch arm on either side thereof. As detailed below, the engagement knobs 22 and 24 engage cooperatively shaped lands on the butt end 114 of the catch handle half 104 to securely latch the two handle halves 104 and 106 together, either in in the closed or open position.

A bore 26 is formed in sidewall 118 and an axially aligned bore 28 is formed in the opposite sidewall 120; as may be seen, the outermost edges of the bores 26 and 28 may be counterbored or chamfered if desired. Each of the bores 26 and 28 have a non-circular opening. As best shown in FIGS. 2 and 3, a flattened or planar face 30 is formed in the wall that defines the periphery of the bores 26 and 28. In the embodiment shown in the drawings, the planar face 30 is oriented such that the plane of the face 30 is normal to the longitudinal axis defined along the handle half 106. Further, the planar face 30 of both bores 26 and 28 is oriented toward the forward end 112 of handle 106. As detailed below, the purpose of the planar face 30 is to cooperate with a mating planar face of a magnet received in the bore to prevent rotation of the magnet relative to the bore and thus the handle. It will be appreciated, therefore, that there are numerous equivalent structures that would prevent relative rotation of the magnet and the handle, including for instance non-circular openings, keyway structures, adhesives and the like.

A bore 34 is formed in the enlarged proximal end 14 of latch arm 12. The bore 34 is formed only partially through the latch arm so that a shelf 36 is formed at one side of the bore to thereby define a magnet-receiving cavity 38 in the latch arm. An axial through bore 40 is formed in shelf 36. Like bores 26 and 28, bore 34 includes a planar or flattened section 31. However, as best seen in FIG. 3, the flattened section 31 of bore 34 is oriented 180 degrees opposite the planar face 30 of bores 26 and 28. Stated another way, the flattened section 31 of bore 34 is oriented toward the butt end 114 of handle 106.

Three magnets 50a, 50b, and 50c are incorporated in the latch mechanism 10 shown in FIGS. 1, 2, and 3. In the embodiment shown, each is identical in configuration. Each of magnets 50a, 50b, and 50c is generally donut-shaped with a central bore 52 and a perimeter 54 that is circular except at a planar or flattened section 56. Each magnet has a positive and negative pole, which are referenced herein with the more common designation of north and south ("N" for north, "S" for south). In the illustrations, the S pole is in the flattened section 56 and the N pole is 180 degrees opposite. It will be appreciated that the N and S pole orientation on the magnets is arbitrary and could be reversed with respect to the flattened sections 56.

A first magnet 50a is inserted into bore 28 of handle half 120—the diameter of the magnet is substantially the same as the diameter of the bore so that there is a close tolerance between the perimeter of the magnet and the wall of the bore. The magnet 50a is only insertable into the bore 28 with the flattened face 56 of the magnet 50a oriented parallel to the flattened face 30 of the bore. If the catch handle 106 is a ferrous material, the magnet 50 will be retained in bore 28 with magnetic attraction. The magnet is prevented from rotation in the bore by virtue of the mating planar faces 56 and 30. The magnet may be glued in the bore, as well, with appropriate adhesives.

A second magnet 50b is inserted into bore 34 in the enlarged proximal end 14 of latch arm 12 such that the flattened face 56 of the magnet aligns parallel to the cooperative flattened face 30 of the bore 34. The thickness of the magnet 50b that is inserted into bore 34 is the same as the "depth" of cavity 34 so that one sidewall of the magnet rests on shelf 36 and the opposite sidewall of the magnet lies in the same plane at the planar sidewall 58 of the latch arm 12 around the periphery of bore 34. As noted above, the planar section 30 of bore 34 is 180 degrees opposite the planar sections 30 of bores 26 and 28. As such, the S pole of the magnet 50b that is received in bore 34 is at 180 degrees relative to the S pole of the adjacent magnet 50a in bore 28.

The magnet that is in bore 34 cannot rotate in the bore (due to the mating planar faces) and may also be glued in place. The center bore 52 axially aligns with bore 40 in shelf 36.

The latch arm 12 with a magnet 50*b* installed in bore 34 may be oriented in the latch arm slot 60 between sidewalls 118 and 120 of handle half 106—the slot 60 opens toward the butt end 114 of the handle. The width of slot 60 is slightly greater than the width of the latch arm 12 so that the latch arm is capable of rotational, pivotal movement. A small outwardly projecting "ear" 80 is formed on the outer perimeter of the proximate end 14 of latch arm 12 in order to prevent the latch arm from rotating into the blade groove 116 of handle half 106.

The third magnet 50*c* is inserted into bore 26 through sidewall 118. To reiterate, the magnet is insertable into the bore only with the flattened section 56 oriented parallel to the flattened face 30 of the bore 26. And again, the flattened section 30 is oriented toward the forward end 112 of handle 106. As such, the S pole of the magnet 50 that is in bore 26 is oriented 180 degrees to the S pole of the adjacent magnet 50 that is in bore 34 of latch arm 12.

A retaining pin 62 includes a first pin half 64 and a second pin half 66. The respective halves of retaining pin 62 are inserted in opposite sides of the aligned bores 52 through the three magnets and the retaining pin is tightened (for example, with a threaded attachment). Each of the pin halves 64 and 66 of the retaining pin 62 has an enlarged diameter head 68 that fits into the counterbored outer portions of bores 26 and 28, and when the pin halves 64 and 66 are tightened to one another, the magnets 50 are retained in position in the handle 106 and latch arm 12 while the latch arm 12 is free to rotate about the pin 62.

The structures of catch handle 104 that cooperate with latch mechanism 10 to interconnect the two handle halves 104 and 106 are best seen in FIGS. 2 and 3. Specifically, a pair of semi-circular notches 72 and 74 (notch 72 is in sidewall 118 and notch 24 is in sidewall 120) are formed in the butt end 114 of handle half 104 and the notches 72 and 74 are sized to receive the engagement knobs 22 and 24 on the distal end 16 of latch arm 12. The notches 72 and 74 open toward butt end 114, and together define a relatively constricted and narrowed passageway 76, which together define a seat, also called a land, for the distal end of the latch arm 12. It will be appreciated that the size of the narrowed passageway 76 is sufficient that knobs 22 and 24 will pass through the passageway so that the knobs 22 and 24 may be received in the notches 72 and 74, respectively.

Operation of the magnetically actuated mechanical latch mechanism 10 will now be described. When knife 100 is situated with the blade 102 in either the open or the closed position, the handles 104 and 106 are parallel to one another and aligned longitudinally with the longitudinal axis of the blade 102. A characteristic of nearly all BALI-SONG® and butterfly type knives is that in these positions—both open and closed—for example, the open position as shown in FIG. 1, the handles require force applied to the handles to squeeze them together because the handles have hit a stop point that is created by the specific construction of the blade and the handles and the way that they are interconnected. The "stop point" is established with a pair of pins 200 and 202 (see FIG. 1) that are attached to and extend from the tang portion of the blade along the longitudinal centerline of the blade. The pin 200 is forward of the pivot axes defined by pivot points 108 and 110 and the pin 202 is rearward of these two pivot axes. The knife is constructed such that the two handle halves 104 and 106 make contact with the pins 200 and 202 when the handle halves 104 and 106 are in the open and closed position, and such that the handle halves 104 and 106 are spaced apart. With sufficient squeezing force applied to the handles, the two halves 104 and 106 may be forcibly moved closer together. Said another way, owing to the construction of the blade pivots and the pins 200 and 202, the butt ends of the handle halves 104 and 106 remain separated at all times. The spacing between the handle halves 104 and 106 depicted in FIG. 1 is a typical spacing when the handle halves 104 and 106 have hit the stop point. Moving the halves closer together can be done only by squeezing the handles together.

Given the polar orientation of the three magnets 50*a*, 50*b*, and 50*c* described above, with two outer magnets 50*a* and 50*c* having their S poles oriented in the same position relative to one another—i.e., the S poles are oriented toward the forward end of the handles, and the inner magnet 50*b* that is sandwiched between them with its S pole oriented 180 degrees opposite—i.e., with its S pole oriented toward butt end 114, it will be appreciated that the normal or "home" position for latch arm 12 is that shown in FIGS. 1 and 2. In other words, the repulsive force between the oppositely oriented magnets normally drives the latch arm 12 to the position of FIGS. 1 and 2 in which the long axis of the latch arm is aligned with the long axis of the handles. The latch arm 12 may be pivoted about the pin 62 but whenever it is pivoted out of the home position the repulsive force of the magnets must be overcome. And absent any force applied to the latch arm, it will remain or be in the home position.

In order to latch the two handle halves 104 and 106 together in either the blade-open or blade-closed position, the handle halves are squeezed together and the latch arm 12 is pivoted from handle half 106—the latch handle—toward handle half 104—the catch handle—against the repulsive force of the magnets 50*a*, 50*b*, and 50*c*. As the latch arm 12 is pivoted to about 90 degrees, the latch arm 12 enters the blade slot 116 and knobs 22 and 24 approach and then pass through passageway 76 until the knobs enter the notches 72 and 74. When the squeezing force that is being applied to the handle halves 104 and 106 is released, the two handle halves 104 and 106 are repulsed away from one another—as noted, this is due to the specific construction of most butterfly knives, such as BALI-SONG® knives, causing the knobs 22 and 24 to seat within the semi-circular notches. With knobs 22 and 24 in the notches 74 and 72, respectively, the two handle halves 104 and 106 are thus engaged with one another and fully latched. Because the handles are urged away from one another due to the normal construction of butterfly knives, such as BALI-SONG® knives, the latch mechanism 10 retains the handles firmly in the latched position.

The magnetically actuated mechanical latch mechanism 10 is used to unlatch the two handle halves 104 and 106 in the reverse process. Specifically, with the latch mechanism 10 engaged as just described, the user again squeezes together the two handles 104 and 106. As the handles are forced toward one another, the knobs 22 and 24 slip out of the seat defined by the notches 72 and 74 and the force of the oppositely oriented magnets drives the latch arm 12 to its home position (FIGS. 1 and 2) and the two handle halves are thus free to be manipulated relative to one another and the blade 102.

It will be appreciated that many of the flipping techniques that users of butterfly type knives, such as BALI-SONG® knives, enjoy are done with the handles unlatched from one another. With a knife 100 that incorporates a magnetically actuated latch 10 as described above, when the latch arm 12 is in the home position it is retained in that position under the repulsive force of the magnets. As such, the latch arm will not flip back and forth about its pivot as the knife is manipulated and there is no annoying clicking sound coming from the latch arm.

Figure 4:
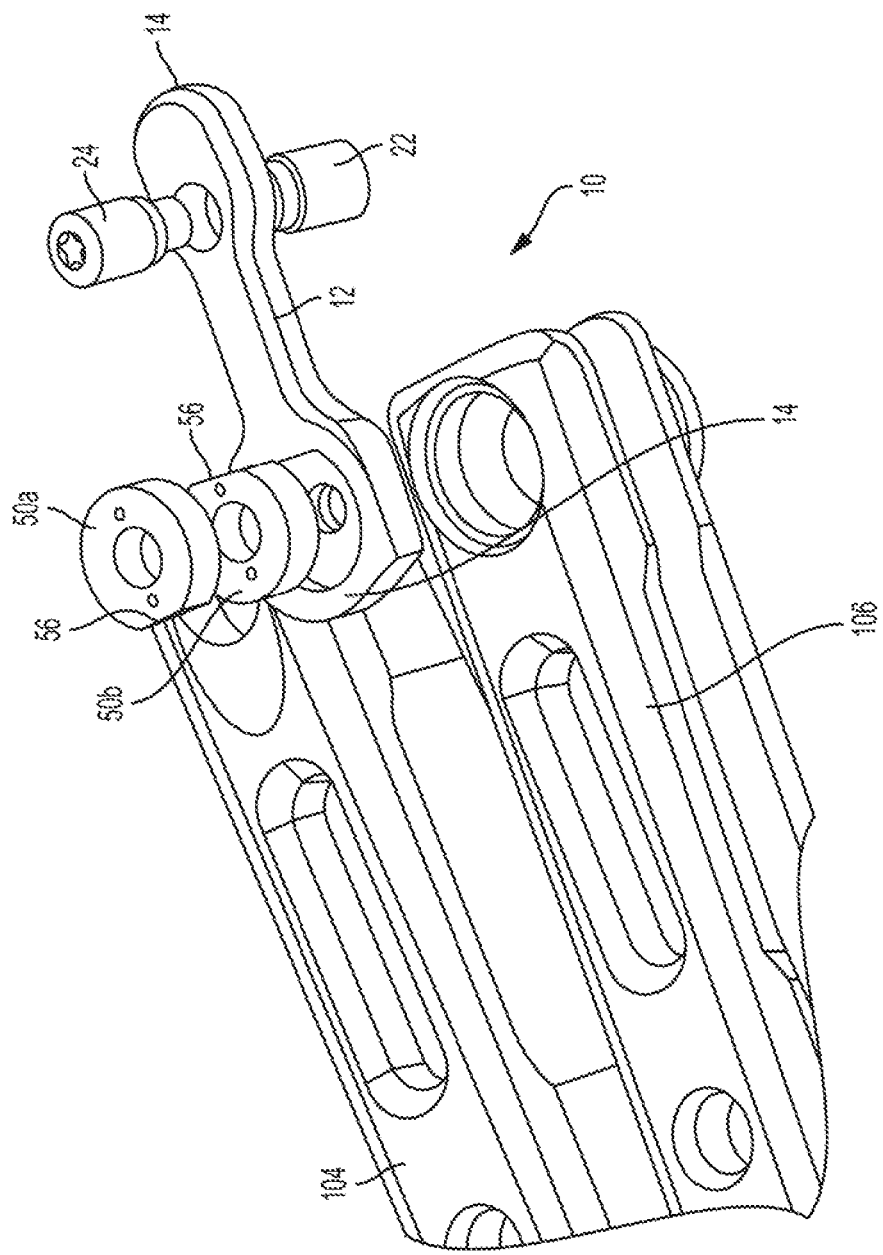
FIG. 4 is a close up perspective and exploded view of an alternative embodiment of a magnetically actuated latch arm according to the present disclosure, in accordance with various embodiments.

Turning now to FIG. 4, a knife 100 that incorporates an alternative embodiment of a magnetically actuated mechanical latch mechanism 10 according to the disclosure is illustrated. The knife 100 shown in FIG. 4 is, except as specifically set forth below, identical to the knife 100 described above and shown in FIGS. 1 through 3. The magnetically actuated mechanical latch mechanism 10 used in the knife of FIG. 4 utilizes 2 magnets 50a and 50b, each with its north pole rotated 180 degrees relative to the other. Those of skill in the art will appreciate that, all other things being equal, the repulsive force between the two magnets 50a and 50b in the embodiment of FIG. 4 will be relatively less than the repulsive force derived from the three-magnet version of FIG. 1. However, the latch mechanism functions otherwise identically to that described above.

Figure 5:
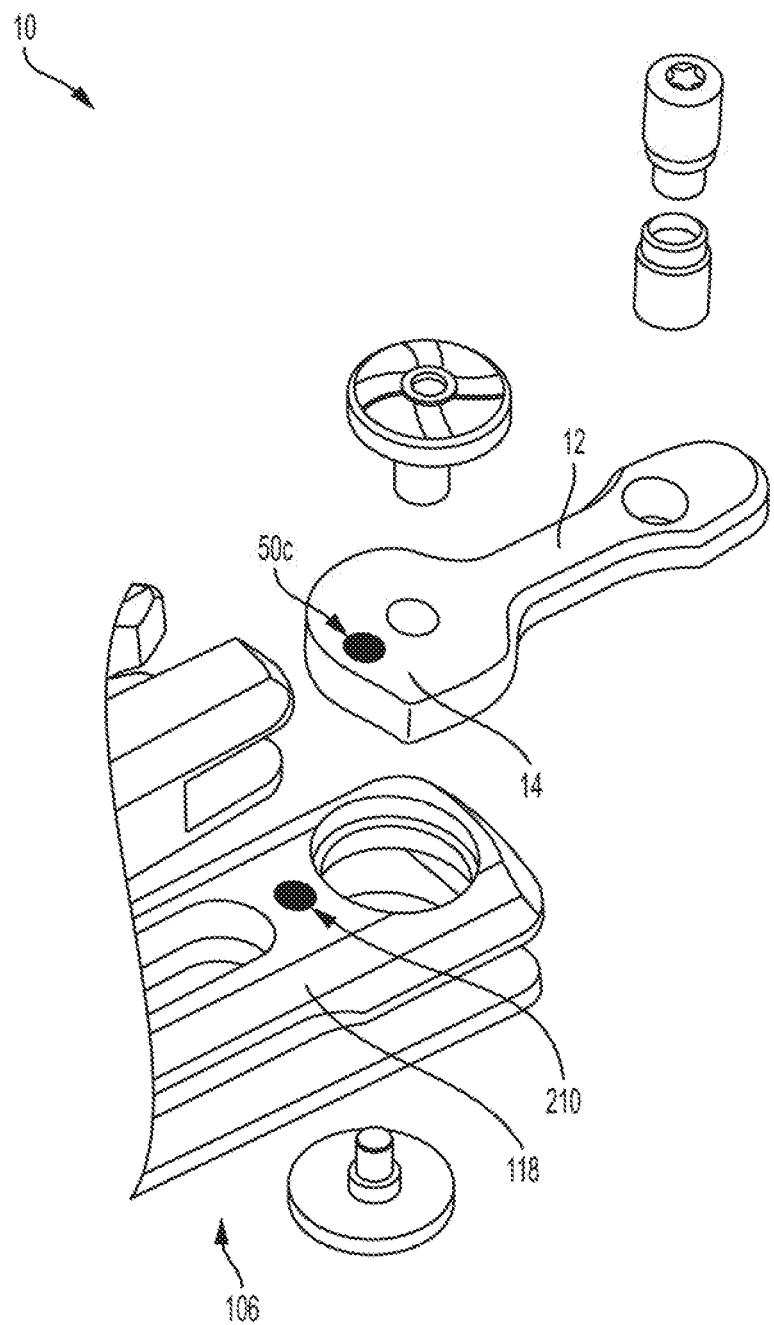
FIG. 5 is a close up perspective view of the butt end of a BALI-SONG® knife according to the present disclosure in which another alternative embodiment of a magnetically actuated latch mechanism is incorporated, in accordance with various embodiments.

With reference to FIG. 5, another alternate embodiment of magnetically actuated mechanical latch mechanism 10 is illustrated. Mechanism 10 in this embodiment is defined by a single (or multiple) magnet 50c embedded in or otherwise attached to the butt end 14 of latch arm 12 and a steel, ferrous plug 210 is embedded in sidewall 118 of handle half 106 in a position such that the attractive force of the magnet acting on the ferrous plug 210 causes the latch arm to normally assume the "home" position shown in FIG. 5.

Those of skill in the art will also recognize that greater than 3 magnets may be used to actuate latch arm 12.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A butterfly knife having a magnetic latch, comprising:
a first handle half having a first side wall, a second sidewall, a front end, and a butt end;
a second handle half having a first side wall, a second sidewall, a front end, a butt end, and a retention element at the butt end;
a blade having a working end and a tang, wherein the front end of the first handle half and the front end of the second handle half are independently pivotally attached to the tang at independent pivot points; and wherein the first handle half and the second handle half can be independently moved to an open position and a closed position; and
a latch arm having a proximal end and a distal end, the proximal end of the latch arm pivotally mounted to the butt end of the first handle half, wherein the proximal end of the latch end comprises a first magnetic element that is magnetically coupled to the first handle half to extend the latch arm axially with respect to a long axis of the first handle half in the absence of an applied force, and the distal end comprising a coupling element that couples to the retention element at the butt end of the second handle half to securely latch the first handle half and the second handle half together, either in in the closed or open position.

2. The butterfly knife of claim 1, wherein the first handle half comprises a first side wall and a second sidewall and wherein the latch arm is pivotally mounted between the first side wall and the second sidewall.

3. The butterfly knife of claim 1, wherein the coupling element at the distal end of the latch arm comprises an engagement boss.

4. The butterfly knife of claim 3, wherein the engagement boss comprises engagement knobs extending away from the latch arm on either side thereof.

5. The butterfly knife of claim 3, wherein the retention element comprises a lands on the butt end of the second handle half and the engagement boss is configured to engage the lands.

6. The butterfly knife of claim 1, wherein the first handle half comprises at least one additional magnetic element that magnetically couples to the first magnetic element to cause the latch arm to extend.

7. The butterfly knife of claim 6, wherein the first sidewall of the first handle half comprises at least one second magnetic element that magnetically couples to the first magnetic element to cause the latch arm to extend.

8. The butterfly knife of claim 6, wherein the first sidewall of the first handle half comprises at least one additional magnetic element and the second sidewall of the first handle half comprises at least one third magnetic element that magnetically couples to the magnetic element to cause the latch arm to extend.

9. The butterfly knife of claim 1, wherein the first handle half comprises a ferromagnetic insert that magnetically couples to the first magnetic element to cause the latch arm to extend.

10. A magnetic latch for a folding butterfly knife, comprising:
a latch arm having a proximal end and a distal end, the proximal end of the latch arm pivotally mounted to a butt end of a first handle half, wherein the proximal end of the latch end comprises a first magnetic element that is magnetically coupled to the first handle half to extend the latch arm axially with respect to a long axis of the first handle half in the absence of an applied force, and the distal end comprising a coupling element; and
a retention element at the butt end of a second handle half, that couples to the coupling element to securely latch the first handle half and the second handle half together.

11. The magnetic latch of claim 10, wherein the first handle half comprises a first side wall and a second sidewall and wherein the latch arm is pivotally mounted between the first side wall and the second sidewall.

12. The magnetic latch of claim 10, wherein the coupling element at the distal end of the latch arm comprises an engagement boss.

13. The magnetic latch of claim 12, wherein the engagement boss comprises engagement knobs extending away from the latch arm on either side thereof.

14. The magnetic latch of claim 12, wherein the retention element comprises a lands on the butt end of the second handle half and the engagement boss is configured to engage the lands.

15. The magnetic latch of claim 10, wherein the first handle half comprises at least one additional magnetic element that magnetically couples to the first magnetic element to cause the latch arm to extend.

16. The magnetic latch of claim 15, wherein the first sidewall of the first handle half comprises at least one second magnetic element that magnetically couples to the first magnetic element to cause the latch arm to extend.

17. The magnetic latch of claim 15, wherein the first sidewall of the first handle half comprises at least one additional magnetic element and the second sidewall of the first handle half comprises at least one third magnetic element that magnetically couples to the magnetic element to cause the latch arm to extend.

18. The magnetic latch of claim 10, wherein the first handle half comprises a ferromagnetic insert that magnetically couples to the first magnetic element to cause the latch arm to extend.

* * * * *